United States Patent [19]

Hughes

[11] Patent Number: 5,495,745
[45] Date of Patent: Mar. 5, 1996

[54] APPARATUS AND METHOD FOR IMPROVING LIQUID GAGING SYSTEM USING ERROR COMPENSATION DATA

[75] Inventor: Ivor Hughes, North Ferrisburg, Vt.

[73] Assignee: Simmonds Precision Products, Inc., Akron, Ohio

[21] Appl. No.: 250,973

[22] Filed: May 31, 1994

[51] Int. Cl.⁶ .................................................. G01F 17/00
[52] U.S. Cl. ............................................................. 73/1 H
[58] Field of Search ........................ 73/1 H, 291, 304 C, 73/149; 364/509, 551, 571.01, 571.07

[56] References Cited

U.S. PATENT DOCUMENTS

| | | | |
|---|---|---|---|
| 4,545,020 | 10/1985 | Brasfield | 364/509 |
| 4,811,596 | 3/1989 | Wolfgang | 73/149 |
| 5,072,615 | 12/1991 | Nawrocki | 73/291 |
| 5,138,559 | 8/1992 | Kuehl et al. | 364/509 |

Primary Examiner—Robert Raevis
Attorney, Agent, or Firm—Leonard L. Lewis; Richard A. Romanchik

[57] ABSTRACT

Apparatus for improving the accuracy of a fuel gaging system already installed on an airplane of the type having a number of fuel level sensors that each produce an output signal that can be combined to determine fuel volume. The apparatus includes control means for energizing the sensors, receiving the sensor signals and calculating a first volume value. An attitude indicator may be provided that is connected to the control means and that produces signals corresponding to the attitude of the fuel level relative to the sensors; the control means includes memory means for storing volume measurement compensation data based on predetermined volume measurement errors that are a function of fuel volume, and attitude when the attitude indicator is used; the control means compensating the first volume value to produce a second fuel volume value that is more accurate than the uncompensated first volume value.

9 Claims, 4 Drawing Sheets

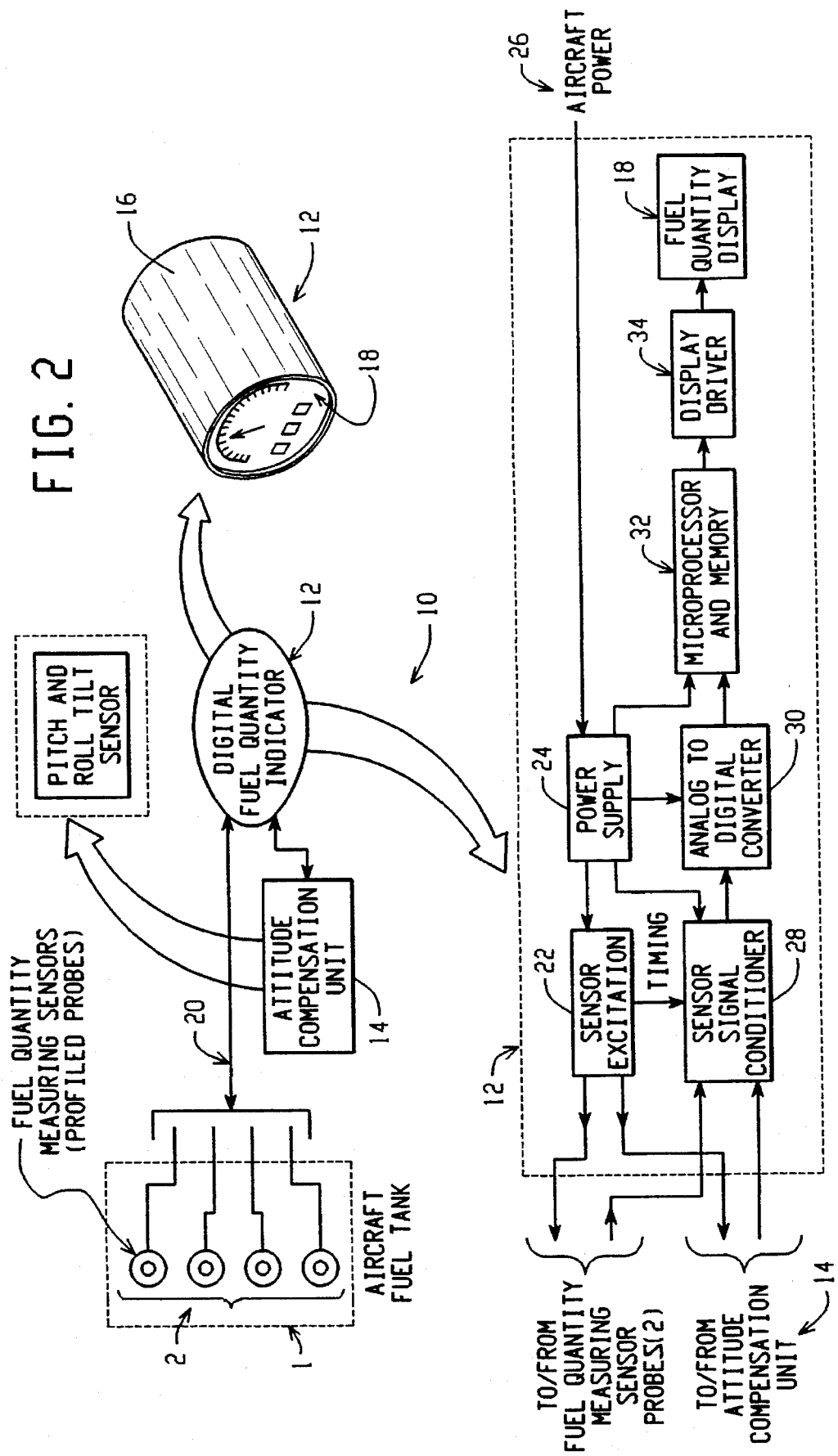

APPARATUS AND METHOD FOR IMPROVING LIQUID GAGING SYSTEM USING ERROR COMPENSATION DATA

BACKGROUND OF THE INVENTION

The invention relates generally to methods and apparatus for gaging the volume of liquid in a container. More specifically, the invention relates to improving the accuracy of such methods and apparatus by compensating volummetric measurements for inaccuracies that are dependent on the volume of liquid in the container and attitude variations of the container.

Many different types of liquid gaging apparatus are well known. For example, capacitive fuel level sensors have been used for many years as part of fuel gaging apparatus for aircraft fuel tanks. Other types of sensors for fluid gaging include resistive, acoustic and optic, for example.

In the example of fuel gaging apparatus for aircraft, such systems have been installed on some airplane models for as many as twenty to thirty years. As original equipment, these systems were state of the art and have served well the needs of airplane designers and users for many years. A typical system includes profiled capacitive tank probes and electro-mechanical servo driven cockpit fuel gages and indicators. Any number of probes may be installed in a given tank depending on the accuracy desired, attitude range, complexity of the tank geometry and the need to be able to obtain accurate readings when one or more probes fails to operate properly.

Such probes typically operate by detecting the level or height of fuel in the tank at each probe location. By knowing the geometry of the tank, and the fuel level within various regions of the tank, the total volume (and hence mass when the density is known or approximated) of fuel can be determined, as is well known. For example, with a vertically oriented capacitive probe, the probe capacitance can vary in relation to the percent immersion of the probe in the fuel. By "profiled" is simply meant that the output of a particular probe is adjusted to take into account the different shapes and profiles that a fuel tank may have.

Because of the high replacement cost and long lead times for acquiring new aircraft, and further due to the proven reliability of many of the older aircraft in use today, the current practice of the commercial airlines and military is to continue to keep these older airplanes in service by performing system upgrades to extend the airplane's useful life. Even a complete aircraft overhaul can be significantly less expensive than the purchase of a new or recently built airplane.

Such upgrades can involve any or every aspect of an airplane design from structural repairs and engine replacements to installing more modern avionics equipment. These upgrades often involve the fuel quantity gaging equipment where there is a desire for improved accuracy in fuel quantity measurement. Often, such performance upgrades include the desire to replace the old cockpit electromechanical indicators with more reliable digital indicators, such as for example, an LCD indicator.

The general criteria to enable upgrading airplane designs are cost (including replacement and maintenance), preferably minimal aircraft modifications (for example, a new piece of equipment typically will have to be a direct form, fit and function replacement of the existing system), and improved system performance.

The present invention is directed to improving accuracy of existing and/or installed liquid gaging systems, such as for example, airplane fuel gaging equipment, without having to discard or replace the basic components of such systems as has normally been the case heretofore. The invention thus enables an existing liquid gaging system to continue to use the same profiled probes, for example, while achieving a substantial improvement in fluid gaging accuracy, simply by replacing, for example, the fuel quantity indicator. The invention thus avoids having to remove the actual tank probes and replacing them with new and possibly additional probes as typically would be the case heretofore.

SUMMARY OF THE INVENTION

To the accomplishment of the foregoing objectives, the invention contemplates, in one embodiment, apparatus for improving the accuracy of a fuel gaging system already installed on an airplane of the type having a number of fuel level sensors that each produce an output signal that corresponds to the fuel level at the sensor, the apparatus comprising: control means for receiving the signals from the sensors; the control means comprising memory means for storing volume measurement compensation data based on error factors that are a function of fuel volume relative to a first accuracy tolerance range; the control means calculating a first volume value and compensating the first volume value using the compensation data resulting in a second volume value within a second accuracy tolerance range that is more accurate than the first tolerance range, the control means thereby producing a fuel quantity output that is more accurate than a fuel quantity output based on uncompensated volume measurement values.

The invention further contemplates the methods embodied in the operation and use of such apparatus, as well as a method for improving the accuracy of a fuel gaging apparatus already installed on an airplane of the type having a number of fuel level sensors that each produce an output signal that corresponds to the fuel level at the sensor, which output signals can be combined to determine fuel volume accurate to within a first tolerance range, the method comprising the steps of:

receiving the output signals from the sensors;

calculating a first volume measurement value based on the sensor output signals;

storing a plurality of volume compensation data values based on repeatable errors in the volume measurement values that are a function of the fuel volume relative to the first tolerance range; and compensating the first volume value with the compensation data to derive a second volume value accurate within a second tolerance range that is more accurate that the first tolerance range.

These and other aspects and advantages of the present invention will be readily understood and appreciated by those skilled in the art from the following detailed description of the invention with the best mode contemplated for practicing the invention in view of the accompanying drawings.

BRIEF DESCRIPTION OF THE DRAWINGS

FIG. 2 is a system functional block diagram of an apparatus according to the invention for upgrading a fuel gaging system, including a detailed block diagram of an integrated fuel quantity indicator;

DETAILED DESCRIPTION OF THE INVENTION

Figure 1:
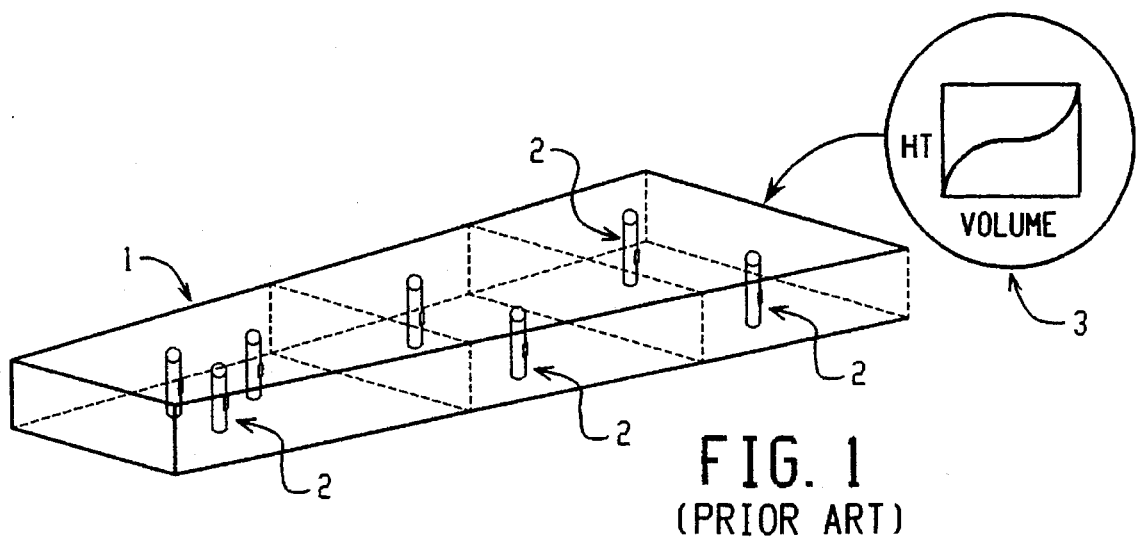
FIG. 1 is a simplified schematic drawing of a typical installation for an aircraft fuel tank.

With reference to FIG. 1, there is shown in a simplified schematic manner a typical aircraft fuel tank 1 installation of a series of fuel gaging sensors or probes 2. The tank 1 may be sectional in design (as shown in phantom in FIG. 1), and is often installed in a wing or fuselage of an airplane, and hence can have a widely variant geometry, although for convenience the geometry of the tank in FIG. 1 is simplified. Although the invention is described in the various embodiments herein as adapted for use with aircraft fuel gaging, this is only for convenience and should not be construed in a limiting sense. Those skilled in the art will readily appreciate that the various aspects and advantages of the invention can be realized in many other fluid gaging applications besides aircraft fuel tanks. Furthermore, the invention is not limited to use of the particular type of fuel gaging probe or gauging system described herein.

The terms "quantity" and "volume" with respect to the amount of liquid in a tank or other reservoir are used interchangeably and should not be construed in a limiting sense. The quantity of the liquid can also be viewed in terms of total mass, with mass simply being a value that can be calculated from a measured volume and density.

The probes 2 are disposed throughout the tank 1 as dictated by the particular application. The number of probes (those skilled in the art will understand that the invention can be used with only a single probe if so desired) as well as their placement within the tank 1 will be a function of the accuracy required, redundancy requirements, geometry of the tank, anticipated attitude variations of the tank (such as for example due to aircraft maneuvers in flight) and so on. In the exemplary embodiments described herein, the probes 2 are of the capacitive level detecting design commonly used for many years in the aeronautics industry. Such a probe is well known and basically includes a capacitance that changes value in relation to the level or height of fuel that covers the elongated probe (with the capacitance changes typically being based on the different dielectric constants of air and fuel). The plurality of probes 2 can be used to determine the fuel level, and further with the known geometry of the tank, the volume of the fuel in the tank 1 can be determined. If the fuel density is also known or measured, then the total mass of fuel can be easily calculated from the measured volume.

Each probe 2 includes associated profiling as is well known to those skilled in the art. Each probe is profiled to take into account the tank shape in which it is installed, so that the probe output is linearly proportional to volume of fuel for the tank section associated with the probe. For example, as shown in the inset 3 of FIG. 1, a typical fuel level capacitive probe may produce an output signal that exhibits a non-linear relationship between total fuel volume and height of the fuel at the probe. However, this relationship is known based on the predetermined geometry of the tank. Therefore, profiling can be used to adjust the probe output signal to produce a linear relationship between the probe signal and the fuel volume.

The probe output signals are combined in a known manner to produce a total fuel volume output signal. In older fuel gaging systems, this signal in turn controls operation of an electromechanical servo driven cockpit indicator, for example, as described hereinbefores.

Figure 3:
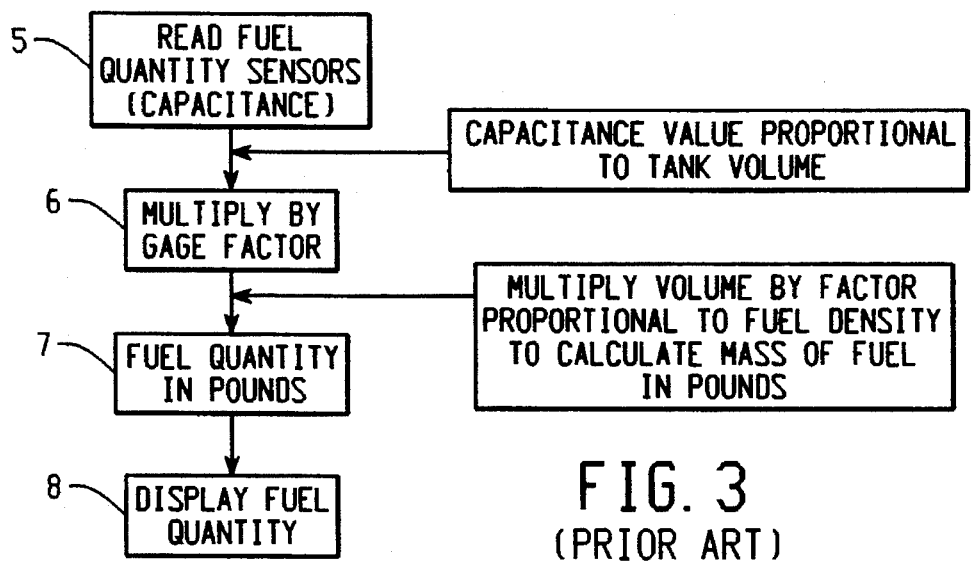
FIG. 3 is a flow diagram of a typical fuel gaging process known heretofore.

FIG. 3 shows a process control for a conventional fuel gaging system known heretofore, such as a class I system described herein. In this process, the probe capacitances are read at step 5, which capacitances are proportional to fuel height and, for a profiled probe, fuel volume. At step 6, the probe output signals are multiplied by a gage factor that represents a density measurement so that the fuel quantity in terms of weight or mass can be calculated and displayed at steps 7 and 8.

Figure 4A:
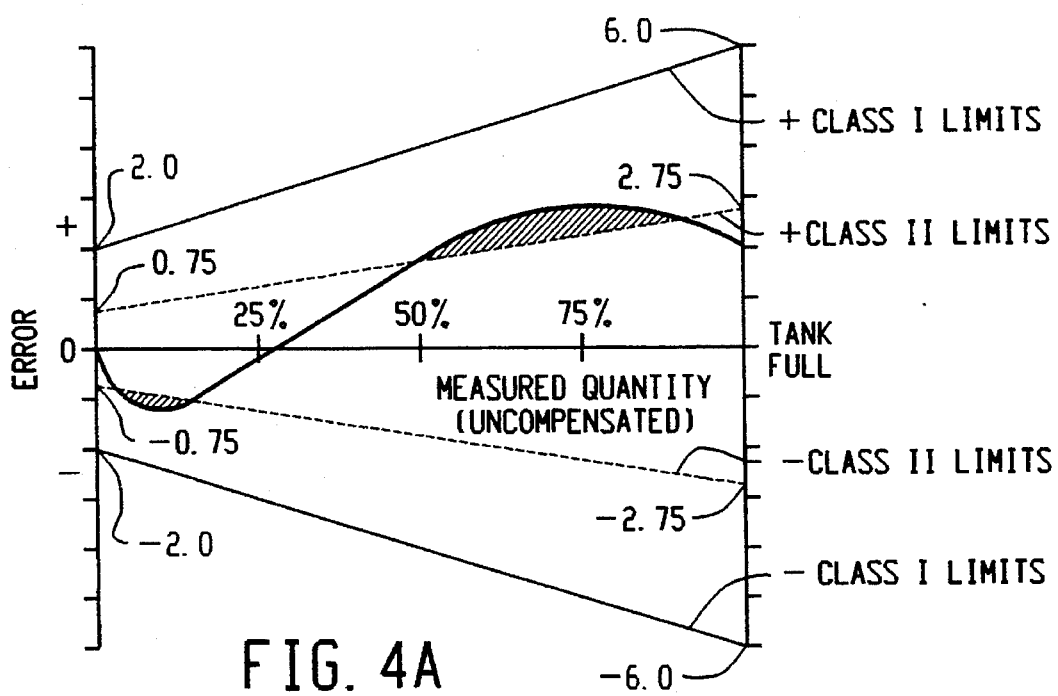
FIGS. 4A–4C illustrate representative (not to scale) volume measurement error vs. volume charts based on different error tolerances and pitch and roll attitude variations.

Even though the probes 2 can be profiled to the particular tank for each application, overall system accuracy is limited. This arises from several sources, including the inherent limitations on accuracy of the probes themselves, as well as the accuracy of the tank geometry characterization. As a result, as shown in FIG. 4A, a typical conventional fuel gaging system has an associated measured volumetric error. This error typically is not a constant but can vary in magnitude with the volume of fluid in the tank and can also vary as a function of aircraft attitude.

As an example, suppose the chart in FIG. 4A represents a typical class I fuel quantity gaging system (as defined, for example, in MIL-G-26988C). As shown, the measured fuel volume error (on the Y-axis) varies in value, and even in sign, as a function of the volume of fuel in the tank. Class I limits are included on the drawing for clarity. Note that in such a typical system the allowed fuel measurement error increases as the fuel volume in the tank increases. The error may be positive when the tank is near full (in the example of FIG. 4A the error is positive for volumes greater than about 26%), and then swings negative when the fuel volume is near empty in the tank. However, these error values are within the acceptable class I limits specified by the appropriate application. In a typical class I system, the allowed fuel measurement error may be ±2% near empty and ±6% near full.

FIG. 4A represents the total volume (system) measurement error vs. fuel volume for a given set of pitch and roll attitude conditions. In actual practice, there will be a family of these types of data plots for each attitude that the airplane must operate over and perform an accurate fuel quantity measurement. This family of plots is partially shown in an exemplary manner in FIG. 4C. For example, for most large planes (commercial and military), the flight envelope will be more restricted than for a fighter aircraft. In any case, the error vs. volume plots may change depending on the particular roll and pitch attitudes of the fuel.

It should be noted that for purposes of this embodiment of the invention, the term "attitude" refers to the general plane of the free surface of the fluid relative to the probes 2. It is this relative attitude (about both the pitch and roll axes) that affects the fuel level probes because, as the aircraft maneuvers, the height of the fuel at each probe may change based on the characteristics of each maneuver or movement.

Figure 4B:
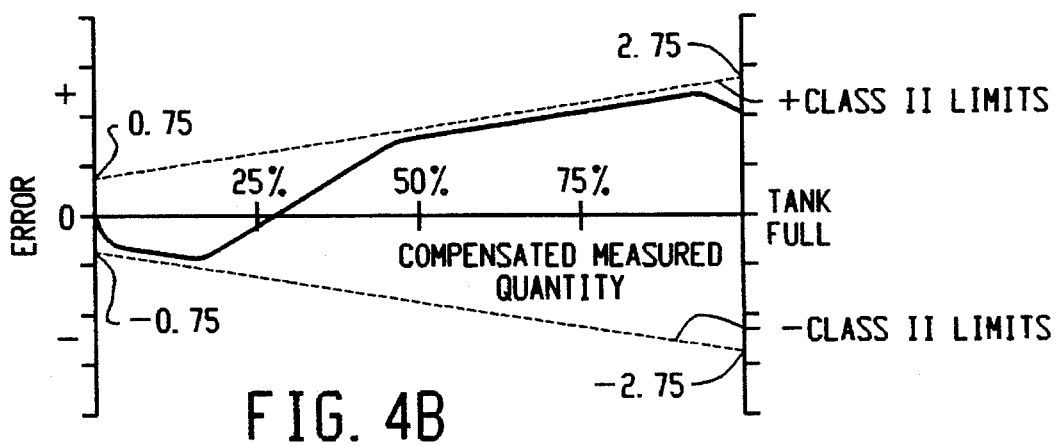
Figure 4C:
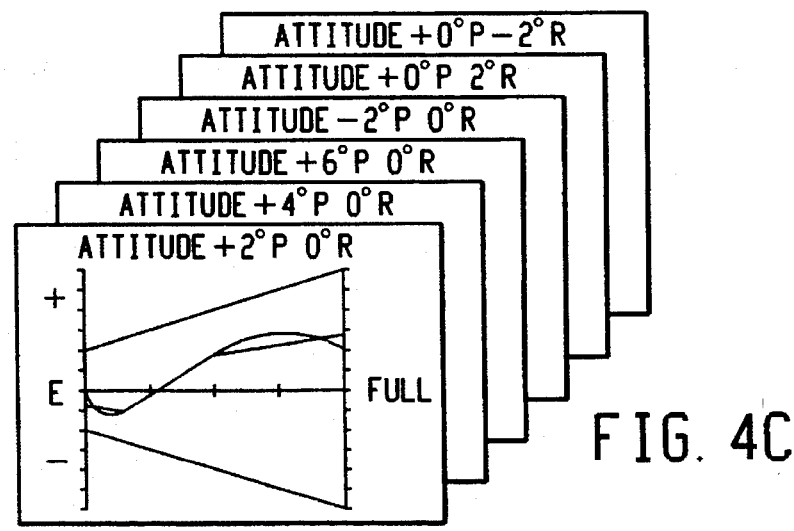

Suppose now, for purposes of explanation only and not by way of limitation, that an existing class I fuel gaging system such as represented in FIGS. 4A, 4C, already installed on an airplane, is to be upgraded to a class II system, or other more stringent performance requirement. One way to accomplish this upgrade would be to simply replace all the profiled probes with the latest design probes having an associated accuracy and processing circuitry sufficient to achieve the required class II accuracy. Such an approach may be very costly however or otherwise impractical, particularly for older aircraft. In accordance with the invention, there will next be described methods and apparatus for achieving such an improved performance without changing or replacing the existing probe arrangement on an aircraft.

FIG. 4A includes a typical representation of the allowed error limits for a class II system (illustrated with the dotted lines). It will be noted that the volume measurement error performance falls outside the more stringent limits over certain portions of the tank volume measurement as highlighted by the shaded regions. However, due to the relatively stable operating characteristics of the probes and known geometry of the fuel tank, these error excursions are predictable and repeatable, and in accordance with one aspect of the invention, can thus be corrected for. In other words, for a given tank design, with a known geometry, having a given set of profiled probes mounted at known locations in the tank, the total volume measurement will have a predictable, predeterminable and repeatable gaging error at each combination of fuel volume and attitude. Thus, during use, the readings obtained at the various volume/attitude combinations that are known to produce system volume error factors outside the new limits, can be compensated so as to bring the system error within the new requirements. This result is depicted in FIG. 4B in which the compensated error vs. volume plot remains within the class II tolerance for the entire tank empty-to-full measurement range.

Those skilled in the art will understand that the invention is not limited to upgrading one aircraft gauging system on a single aircraft, but rather it is contemplated that when a specific system is upgraded, all aircraft having that system can be upgraded in a similar manner. In order to implement the upgrade on a number of such systems installed on aircraft, however, the installed individual fuel level probes should operate within a tolerance such that not only are the aircraft system errors predictable, but so that also the probes will operate within a tolerance to allow the upgraded system to meet the requirements for the new specification. For example, when upgrading from a class I system to a class II system, a fuel quantity indicator can be designed in accordance with the present invention such that its direct installation on any aircraft having the class I system therein will operate to upgrade each aircraft to a class II. However, this approach will perform better when the installed probes operate within a tolerance so that the system operates to produce the predictable error values, as well as operating within a tolerance which, in combination with the fuel quantity indicator, permit the upgraded system to perform to the class II requirements. Alternatively, individual fuel quantity indicators can be designed for particular aircraft having installed probes that do not produce similar predicted error values as produced on other aircraft systems by simply using compensation values tailored for such aircraft. In such cases, however, it will still be desirable that the probes operate within a tolerance that permit the upgraded system to meet the class II requirements.

With reference to FIG. 2, an apparatus 10 for upgrading an existing fuel gaging system, such as may already be installed on an airplane, is shown in functional block diagram form, with a more detailed block diagram of a fuel quantity indicator being shown in the lower half of FIG. 2.

For purposes of this exemplary embodiment, it is assumed that a fuel gaging system comprising a number of fuel quantity probes 2 is already installed in the airplane fuel tanks. One of the probes may be a conventional fuel, compensator used to measure or detect the dielectric constant of the fuel and hence the fuel density, as is well known to those skilled in the art. The apparatus 10 includes a fuel quantity indicator 12 and an attitude compensation unit 14 that in one embodiment can be a commercially available pitch and roll tilt sensor. As shown in FIG. 2, the fuel quantity indicator is a self-contained unit stored in a single housing 16 that conveniently can be located in the cockpit by replacing the existing fuel quantity indicator. The upgraded indicator 12 preferably includes a digital/analog readout display 18. The self-contained indicator 12 preferably only uses input terminals for connecting the indicator to each of the fuel probes 2 via a link 20, such as a cable for example, a connection to the attitude compensation unit 14, and a power supply input from the aircraft power plant.

As shown in greater detail in FIG. 2, the digital fuel quantity indicator 12 includes a probe sensor excitation circuit 22 that connects to each of the probes 2. The excitation circuit 22 design will be determined by the specific type of sensor/probe being used in the aircraft, but is otherwise conventional in design. The excitation circuit 22 receives power from a regulated power supply circuit 24 that is energized from the aircraft power input 26.

Each probe 2 has an output connected to a sensor signal conditioning circuit 28. The attitude compensation unit 14 is also connected to the signal conditioner circuit 28. In this embodiment, signals from the probes and the attitude compensation unit share the same signal conditioning electronics 28 in a time multiplexed manner. Separate signal processing circuits could alternatively be used. In the multiplexing embodiment herein, the excitation circuit 22 sends a timing control signal 30 to the conditioner circuit 28 so that the circuit 28 is configured at the appropriate times for receiving the probe output signals or the attitude compensation unit 14 output signals. Again, the design of the conditioner circuit 28 can be conventional in nature and will depend on the types of probe 2 being used and the output signal characteristics of the attitude unit 14. For example, for capacitance gages, the probes may be excited by a known voltage drive signal so that the current from the probe is proportional to fuel height and can be converted to a corresponding signal suitable for input to the convertor 30. Many other signal processing schemes will be readily apparent to those skilled in the art.

The output of the signal conditioner circuit 28 is input to a conventional analog-to-digital convertor 30 so that the various data signals from the probes 2 and the attitude unit 14 can be formatted for input to a microprocessor 32. The microprocessor includes a memory unit (either on-chip or a discrete memory accessible thereto). The microprocessor 32 operates the fuel quantity display 18 by means of a conventional display driver 34, such as an LCD display driver well known to those skilled in the art.

The microprocessor 32 can be any conveniently available device such as part no. M6805 available from Motorola Corp., for example. The microprocessor 32 is programmed in a conventional manner in accordance with the manufacturer's specifications and conventional programming techniques. Those skilled in the art will readily appreciate that the electronics used for the indicator 12 could also be realized with discrete digital circuitry, for example.

Figure 5:
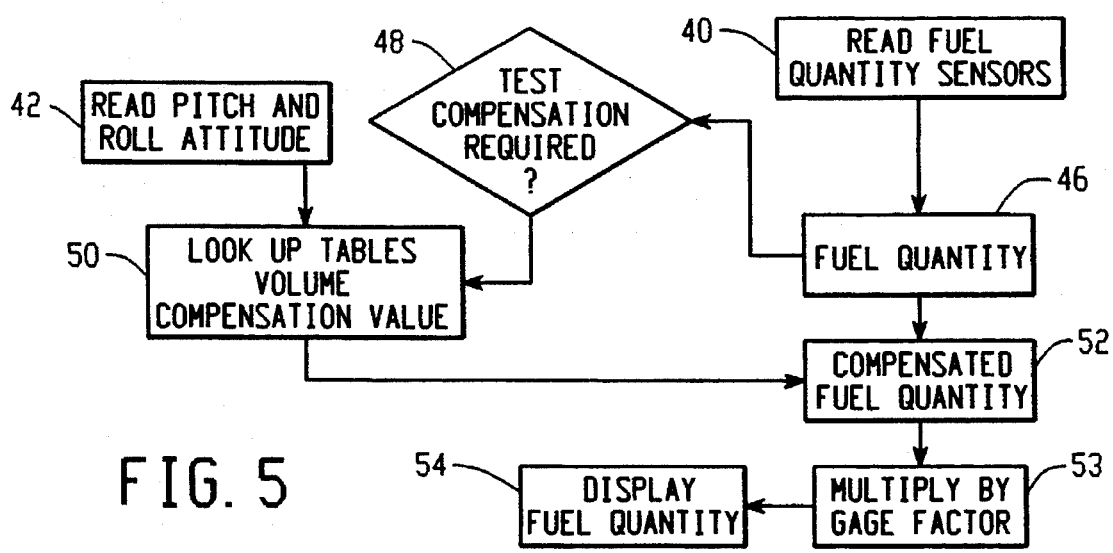
FIG. 5 is a suitable flow diagram for a fuel gaging apparatus according to the invention.

FIG. 5 represents a suitable program sequence or flow diagram for a fuel gaging process in accordance with the invention that can conveniently be implemented in the apparatus 10. At step 40 the fuel quantity probes/sensors are read by applying the excitation signals thereto from the excitation circuit 22. The most recently available pitch and roll values are obtained from the attitude compensation unit 14 at step 42.

The probe 2 outputs are combined so as to produce a fuel quantity value (based on volume or mass, for example) at step 46 in a conventional manner such as performed at step 5 in FIG. 3. However, at step 48 the system checks whether this fuel quantity value 46 needs compensation. This decision is made based on the predictable and hence known or predetermined error response characteristics (exemplified in FIGS. 4A–4C) for each pitch and roll attitude combination as described herein and stored in electronic look-up tables in the memory unit available to the microprocessor 32. If compensation is required, then the appropriate compensation value is obtained from the look-up tables based on the current attitude from step 42, which is then applied at step 50 to produce a compensated fuel quantity value at step 52. The value produced at step 52 is then multiplied by the gage factor at step 53 to adjust the value for the fuel density. This gage factor calculation can be the same as described with respect to FIG. 3, and the result can then be displayed at step 54. If compensation was not required for the current pitch/roll attitude condition, the program could proceed from step 46 directly to 53 if so desired.

Figure 6A:
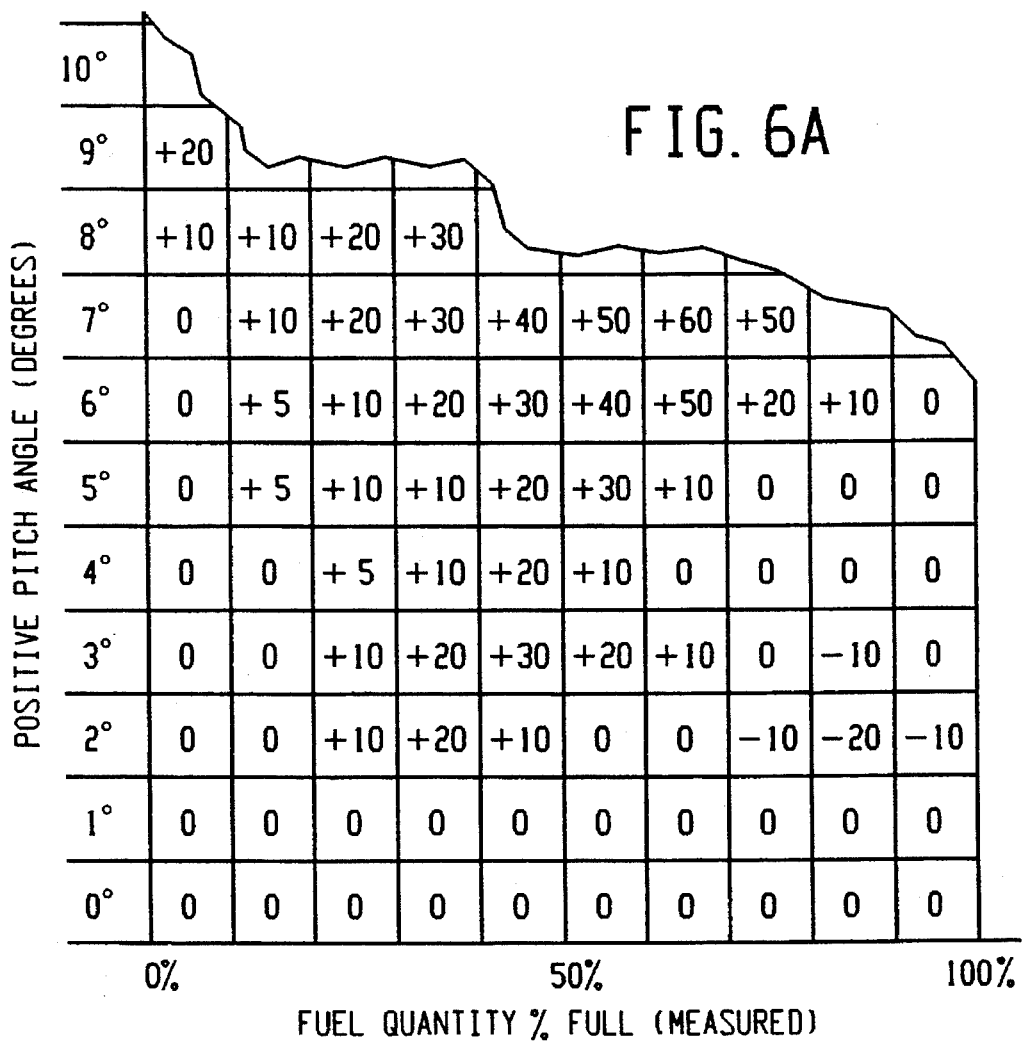
FIGS. 6A and 6B illustrate in an exemplary manner suitable forms of look-up tables for the present invention.
Figure 6B:
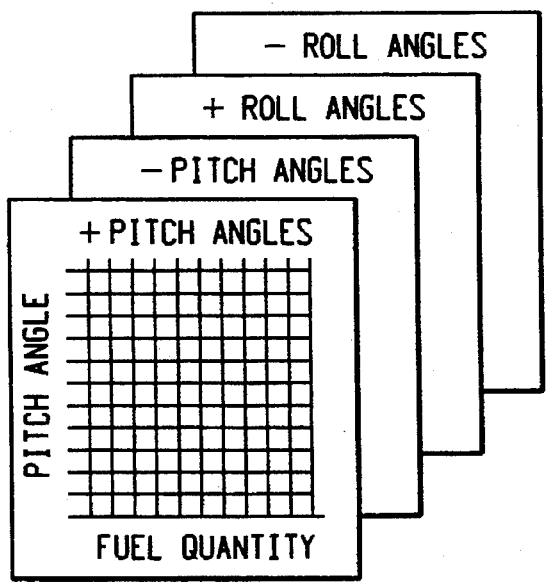

It will be noted that the look-up tables will typically be a family of tables to account for the various combinations of positive and negative pitch and positive and negative roll that may be encountered by the aircraft. FIG. 6B illustrates how there will be a family of such tables for the positive and negative pitch and roll conditions. For example, the first table (as shown in full in FIG. 6B) represents the look up table for compensation values under positive (+) pitch angle conditions, with the positive pitch angles being incremented on the Y axis and the measured but uncompensated fuel quantity (step 46 of FIG. 5) values being incremented on the X axis. FIG. 6A illustrates in greater detail and in a representative manner one such table that provides appropriate compensation values that are added or subtracted from the first volume measurement 46 as noted in the table (in this example for the positive pitch angle conditions). Note how the compensation values are a function of the volume of liquid in the tank, as well as the pitch angle. These compensation factors are selected from the known error response of the installed system, such as illustrated in FIG. 4A, to achieve the error performance such as exemplified in FIG. 4B. Further note that typically at small pitch angles (and similarly for small roll angles) there is no compensation needed—the old gaging systems are typically accurate enough over the full operating range of the tank volume to meet newer error tolerances. The error intolerances typically turn up at greater attitude variations, hence the usefulness of the attitude compensation unit 14.

In some applications, however, the error compensation can be realized based on only the fuel volume in the tank (in other words, the attitude may not significantly affect the accuracy of the system volume measurement), although such situations are less likely in actual practice. As another alternative, rather than having a separate table entry for each pitch/roll angle condition versus volume, an average error correction factor could be used for known volume conditions that require error compensation. Although this approach could be less accurate in some applications, it would reduce the memory requirements and may be accurate enough for specific applications.

The attitude compensation unit 14 can be realized by the use of a commercially available two dimensional tilt sensor, such as part no. SP5000 available from Spectron Glass and Electronics. Such a device is particularly useful with the present invention because the pitch and roll attitudes are determined by the unit based on a small glass capsule containing a small amount of fluid with measurement electrodes. This small amount of fluid effectively mimics the fluid motion of the fuel in the tank (and hence the relative attitude between the free surface of the fuel and the probes 2). This is in contrast to using the aircraft pitch and roll indicators which give the relative attitude of the aircraft but may not represent the relative attitude of the fuel surface. For example, in a coordinated turn the fuel may not have moved, although the aircraft may be in a 3° roll. Alternatively, an accelerometer could be used to determine the relative attitude.

The invention thus provides methods and apparatus for upgrading an existing fluid gaging system to improve the volume measurement accuracy thereof without replacement of the original fuel quantity probes, while at the same time upgrading the fuel indicator readout display.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. Apparatus for improving the accuracy of art operational fuel gaging system previously installed on an airplane of the type having a number of fuel level sensors that each produce an output signal that can be combined to determine fuel volume within a first tolerance range, the apparatus comprising: control means for receiving the sensor signals and calculating a first volume value; and an attitude indicator connected to the control means and that produces signals corresponding to the attitude of the fuel level relative to the sensors; said control means comprising memory means for storing volume measurement compensation data based on predetermined volume measurement errors that are a function of attitude and fuel volume; said control means compensating said first volume value with selected said compensation data based on said attitude signals to produce a second fuel volume value that is more accurate than said uncompensated first volume value.

2. The apparatus of claim 1 wherein said attitude indicator comprises a liquid sensor that mimics changes in the fuel level attitude relative to the sensors.

3. The apparatus of claim 1 wherein each sensor output is profiled based on the sensor's location in a characterized fuel tank, and said compensation data is based on repeatable inaccuracies in volume measurements at predetermined attitudes from the profile data relative to a selected volume measurement tolerance.

4. The apparatus of claim 1 wherein said compensation data comprises a plurality of data values, each data value representing a predicted error compensation value for a volume measurement value at a respective fuel level attitude.

5. The apparatus of claim 4 wherein said memory means stores a plurality of look-up tables, there being a look-up table for each of a predetermined number of detected attitudes; each table providing a correction value for each of a predetermined number of volume measurement values.

6. The apparatus of claim 1 further comprising a sensor excitation circuit; the excitation circuit and said control means being combined into a single unit that further comprises a fuel quantity visual display connected to said control means for displaying fuel quantity, wherein said unit is a self-contained module that has terminals connectable to the sensors and the attitude indicator and a power supply.

7. A method for improving the accuracy of an operational fuel gaging apparatus previously installed on art airplane of the type having a plurality of fuel level sensors that each produces an output signal that corresponds to the fuel level at the sensor, which output signals can be combined to determine fuel volume accurate to within a first tolerance range, the method comprising the steps of:

receiving the output signals from the, sensors;

calculating a first volume measurement value based on said sensors output signals;

detecting attitude of the fuel level relative to said sensors;

storing, for a corresponding plurality of predetermined attitudes, a plurality of predetermined volume compensation data values based on repeatable errors in the volume measurement values that are a function of the fuel volume; and compensating said first volume value with said compensation data value selected for the detected attitude to derive a second volume value accurate within a second tolerance range that is more accurate that the first tolerance range.

8. The method of claim 7 further comprising the step of detecting attitude of the fuel level relative to the sensor.

9. The method of claim 8 wherein the step of storing compensation data includes storing compensation data for each of a plurality of predetermined attitudes.

* * * * *